(12) United States Patent
Wöstmann et al.

(10) Patent No.: US 12,296,375 B2
(45) Date of Patent: May 13, 2025

(54) METHOD FOR PRODUCING A HELIX AND PERMANENT MOLD FOR CASTING A HELIX

(71) Applicant: Fraunhofer-Gesellschaft zur Förderung der angewandten Forschung e.V., Munich (DE)

(72) Inventors: Franz-Josef Wöstmann, Bremen (DE); Michael Heuser, Bremen (DE); Matthias Busse, Bremen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 755 days.

(21) Appl. No.: 17/250,866

(22) PCT Filed: Sep. 19, 2019

(86) PCT No.: PCT/EP2019/075179
§ 371 (c)(1),
(2) Date: Mar. 15, 2021

(87) PCT Pub. No.: WO2020/055840
PCT Pub. Date: Mar. 26, 2020

(65) Prior Publication Data
US 2022/0040751 A1     Feb. 10, 2022

(30) Foreign Application Priority Data
Sep. 19, 2018   (DE) ................... 10 2018 215 987.4

(51) Int. Cl.
*H01F 7/06*     (2006.01)
*B21J 5/00*     (2006.01)
(Continued)

(52) U.S. Cl.
CPC ................. *B21J 5/002* (2013.01); *B22C 9/06* (2013.01); *B22D 17/22* (2013.01); *B22D 25/02* (2013.01);
(Continued)

(58) Field of Classification Search
CPC ........ B21J 5/002; B22D 31/002; B22D 17/22; B22D 25/02; H01F 5/00; H01F 41/04; H02K 15/045; B22C 9/06
See application file for complete search history.

(56) References Cited

U.S. PATENT DOCUMENTS

| | | | |
|---|---|---|---|
| 9,427,800 B2 * | 8/2016 | Werner | B22D 17/14 |
| 2008/0018033 A1 * | 1/2008 | Hiroki | F16F 1/042 |
| | | | 267/182 |
| 2010/0084786 A1 * | 4/2010 | King, Jr. | B29C 45/14639 |
| | | | 425/542 |

FOREIGN PATENT DOCUMENTS

| | | |
|---|---|---|
| CN | 203695881 | 7/2014 |
| CN | 104904102 | 9/2015 |

(Continued)

OTHER PUBLICATIONS

"Japanese Application Serial No. 2021-512517, Office Action dated Apr. 14, 2023", w English Translation, (Apr. 14, 2023), 7 pgs.
(Continued)

*Primary Examiner* — Paul D Kim
(74) *Attorney, Agent, or Firm* — Schwegman Lundberg & Woessner, P.A.

(57) ABSTRACT

A permanent mold can include mold halves which can be joined together on a mold separation plane. The mold halves of the permanent mold are joined together such that the permanent mold has a cavity, which defines the shape of the helix or the shape of a bent-up helix, when the permanent mold is joined together. The specified helix or the bent-up helix has a flattened profiled winding cross-section which (Continued)

has two opposite flat faces, an outer face and an inner face opposite the outer face. The mold separation plane runs at least partly along the flat faces from the inner face to the outer face, wherein the permanent mold has a bulge which extends along the mold separation plane and protrudes into the cavity at least in a region in which the mold separation plane runs along one of the flat faces such that the cast body is provided with recesses on the flat faces.

17 Claims, 10 Drawing Sheets

(51) Int. Cl.
  *B22C 9/06* (2006.01)
  *B22D 17/22* (2006.01)
  *B22D 25/02* (2006.01)
  *B22D 31/00* (2006.01)
  *H01F 5/00* (2006.01)
  *H01F 41/04* (2006.01)
(52) U.S. Cl.
  CPC ............. *B22D 31/002* (2013.01); *H01F 5/00* (2013.01); *H01F 41/04* (2013.01)

(56) References Cited

FOREIGN PATENT DOCUMENTS

| | | |
|---|---|---|
| CN | 107206479 | 9/2017 |
| DE | 102010020897 A1 | 11/2011 |
| DE | 102012212637 A1 | 1/2014 |
| DE | 102013000899 A1 | 8/2014 |
| DE | 102013204047 A1 | 9/2014 |
| DE | 102014106851 A1 | 11/2015 |
| DE | 102015212224 A1 | 1/2017 |
| DE | 102016202657 A1 | 8/2017 |
| EP | 2688183 | 1/2014 |
| FR | 1580467 A | 9/1969 |
| JP | 2015002614 | 1/2015 |
| KR | 101627802 | 6/2016 |

OTHER PUBLICATIONS

"Chinese Application Serial No. 201980061404.2, Office Action dated Apr. 14, 2023", w English Translation, (Apr. 14, 2023), 11 pgs.

"German Application Serial No. 10 2018 215 987.4, Office Action mailed Jan. 7, 2020", (Jan. 7, 2020), 8 pgs.

"German Application Serial No. 10 2018 215 987.4, Office Action mailed Apr. 30, 2019", (Apr. 30, 2019), 7 pgs.

"International Application Serial No. PCT/EP2019/075179, International Search Report mailed Dec. 19, 2019", w/ English Translation, (Dec. 19, 2019), 7 pgs.

"International Application Serial No. PCT/EP2019/075179, Written Opinion mailed Dec. 19, 2019", (Dec. 19, 2019), 8 pgs.

"Chinese Application Serial No. 201980061404.2, Office Action dated Sep. 29, 2022", w English Translation, (Sep. 29, 2022), 12 pgs.

"Canadian Application Serial No. 3,111,344, Office Action dated Dec. 19, 2023", (Dec. 19, 2023), 6 pgs.

\* cited by examiner

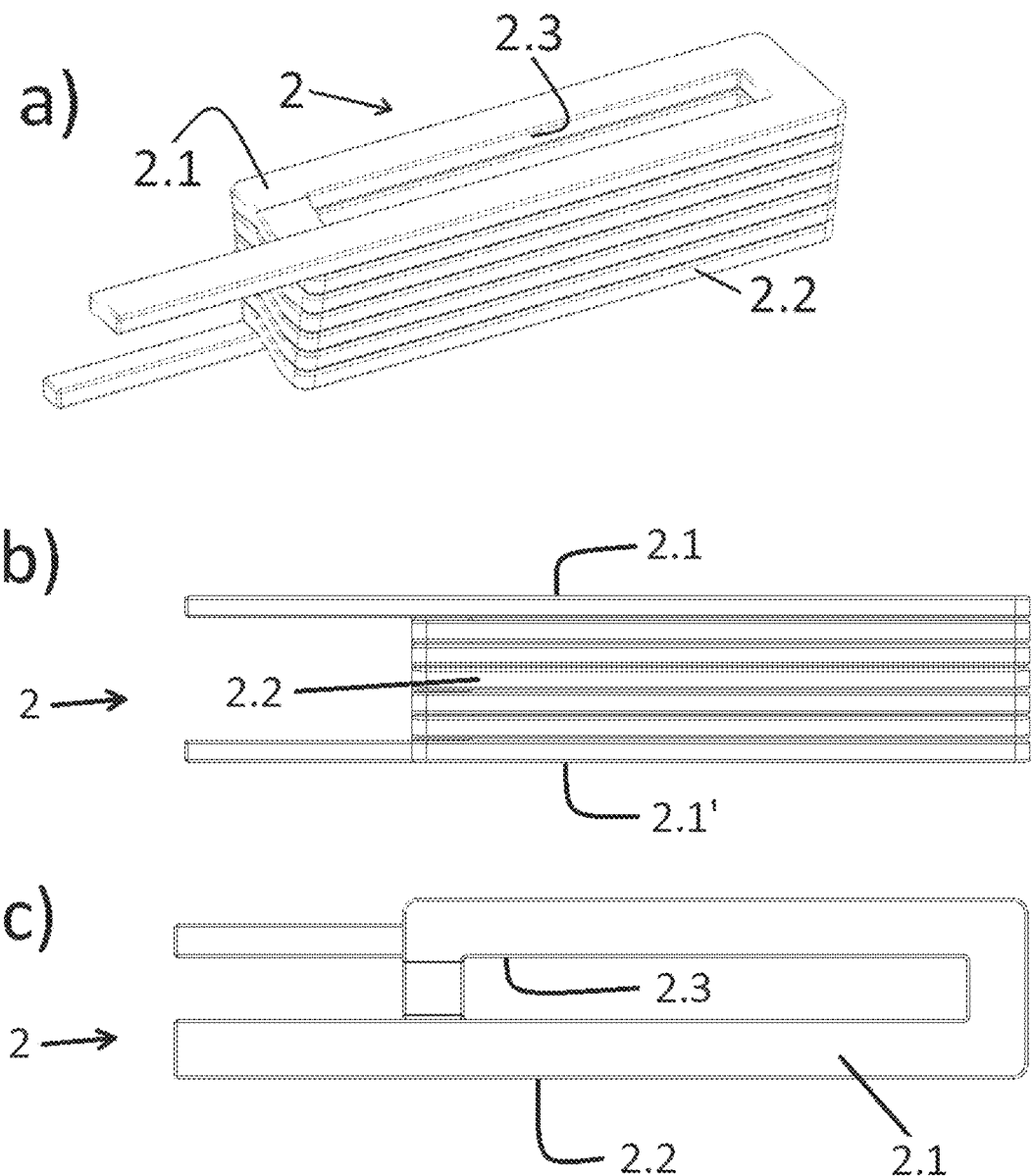

d)

a)

b)

c)

b)

c)

a)

b)

a)

b)

METHOD FOR PRODUCING A HELIX AND PERMANENT MOLD FOR CASTING A HELIX

PRIORITY APPLICATIONS

This application is a U.S. National Stage Filing under 35 U.S.C. § 371 from International Application No. PCT/EP2019/075179, filed on Sep. 19, 2019, and published as WO2020/058407 on Mar. 26, 2020, which claims the benefit of priority to German Application No. 10 2018 215 987.4, filed on Sep. 19, 2018; the benefit of priority of each of which is hereby claimed herein, and which applications and publication are hereby incorporated herein by reference in their entirety.

TECHNICAL FIELD

The present invention relates to a method for producing a helix. It further relates to a permanent mold used to produce a helix, and to a helix produced by means of the method or by means of the permanent mold.

BACKGROUND

Helices used as electric coils, for example, are often wound according to the prior art. In this process, winding is sometimes carried out manually in order to improve the filling level compared to series processes. A significant improvement in performance has recently been achieved with cast coils.

Document DE 10 2012 212 637 A1 describes the casting production of coils. This type of production allows the filling factors, which are unfavorable for windable round wires, to be significantly exceeded by using other wire geometries (which would not normally be windable), thus increasing performance.

SUMMARY

For coils produced by casting technology, for complex geometries, the prior art involves inserting cores or using slides in addition to a mold, which may make production expensive or inefficient.

Furthermore, the mold is subjected to high stresses due to high casting temperatures, which may lead to washouts and cracks in the mold. This damage leads to the formation of raised burrs on the coil surface. The burrs may negatively affect the quality of the manufactured coils and require extensive finishing. As a result, the production processes are complex and the service lives for the molds used are very short, so that the production of cast coils has often not been very economical to date.

It is the object of the present invention to at least partially overcome the above problems.

This is achieved by a method having the features of independent claim 1 and by a permanent mold and helix having the features of the coordinated claims.

Advantageous embodiments will become apparent from the dependent claims as well as from the description and the figures.

The method is used to produce a helix in a casting process.

Here, the method comprises at least one step of providing a permanent mold which has mold halves that may be joined together in a mold parting plane.

The mold halves of the permanent mold are joined together so that the permanent mold, when joined, has a cavity that defines a form of the helix or a form of a bent-up helix.

In this case, the helix or the bent-up helix, which is defined by the cavity, has a flattened winding cross-section profile with two opposite flat sides, an outer side and an inner side opposite the outer side.

The mold parting line runs, in sections, along the flat sides from the inner side to the outer side. The permanent mold has a protrusion extending into the cavity along the mold parting line in at least an area where the mold parting line runs along one of the flat sides. The protrusion tapers the cavity and causes an indentation in the casting to be produced with the permanent mold.

In a further step of the method, a casting material is introduced into the cavity to produce a casting having the form of the helix defined by the cavity or the form of the bent-up helix defined by the cavity.

In a subsequent step, the permanent mold is opened and the casting is removed. Due to the protrusions of the permanent mold extending along its flat sides, the casting has corresponding indentations on its flat sides.

When casting the helix, burrs may occur, as mentioned, in the mold parting line when the casting material gets between the mold halves along the mold parting line.

Therefore, one advantage of the method is that at least a part of the burrs that occur on the flat sides may be shifted to the indentations which are positioned precisely where burrs may occur. For at least one of the areas where the mold parting line runs along the flat sides, the permanent mold, as mentioned, has a protrusion extending along the mold parting line to provide a corresponding indentation in the casting on the corresponding flat side. A burr created there then lies in the indentation. If the casting is in the form of the helix, this burr, which is on the flat side in the indentation, cannot touch adjacent flat sides and is therefore harmless.

Due to complex geometry of the helix or the bent-up helix and the tool required for this, it may be that the mold parting line and thus also the burrs run along the flat sides of the helix multiple times. This may be the case in particular with permanent molds that have exactly two mold halves. The mold parting line then runs, for example per winding, along each of the flat sides, twice from the inner side to the outer side.

Correspondingly, each of the indentations may run from the inner side to the outer side. In an exemplary embodiment, one such indentation is provided in the helix for each region where the mold parting line runs along one of the flat sides. In another embodiment, an indentation in the helix is provided on only a first of the flat sides for each area where the mold parting line runs along these flat sides. Burrs running on the opposite second flat side may be positioned in a plane with the burrs or indentations of the first flat side such that they are positioned in the indentations of the first flat side when the helix is compressed.

If indentations are provided on the first of the flat sides of the helix, it is also possible to provide protrusions extending along the mold parting line on the second of the flat sides instead of further indentations. These protrusions come to lie within the indentations when the casting is in the form of the helix and is compressed, but preferably in such a way that the burrs lying in the indentations and the burrs lying on the protrusions do not touch the other flat side since the indentation is correspondingly larger than the protrusion. This may at least partially compensate for any loss of cross-section caused by the indentations.

In embodiments of the method, it is possible for the mold parting plane to also run, at least in sections, along the outer side and/or along the inner side and/or along edges of the winding cross-section profile.

It is also possible, within the method, to remove burrs running along the outer side and/or inner side and/or edges of the casting after removing the casting from the permanent mold.

The inner sides delimit an inner cavity of the helix into which, for example, a coil core may be inserted. The outer side facing away from the inner side is typically freely accessible when the casting is in the form of the helix or is brought into the form of the helix.

An advantage of the method may therefore be that the outer side and the inner side and the edges where the mold parting plane runs at least in sections are easily accessible when the casting is in the form of the helix or is brought into the form of the helix. In the most recently mentioned embodiment, the burrs run at least in sections along the easily accessible areas mentioned and may be removed with little effort.

In one embodiment of the method, the mold parting line runs predominantly along the outer side and/or the inner side and/or the edges. A length of a cutting line may be defined, in which the mold parting line runs along the molded part lying in the cavity. Burrs may appear along this cutting line. For example, this cutting line runs along the outer side and/or the inner side and/or the edges for at least 60% of its length, preferably for at least 75% of its length, particularly preferably for at least 90% of its length. In the remaining regions, the burrs may run along the flat sides and the above-described indentations along the flat sides of the casting may be rendered harmless.

In one embodiment of the method, the permanent mold comprises exactly two mold halves. Preferably, no additional slides or cores are used.

Embodiments of the method are envisaged in which the cavity does not dictate the form of the finished bent helix, but rather the form of the bent-up helix. In such embodiments, the casting may be bent into the form of the helix after removal. This is done, for example, by pressing together, orthogonally to the flat sides. Compression may also be accomplished by inserting a mandrel into the cavity of the helix, wherein the mandrel may have a flat part at one end that is pressed against the flat side of the helix. As an alternative or in addition to bending into the form of the helix, burrs projecting into the cavity may be bent over by inserting the mandrel.

In the sections in which it runs along the outer side and/or the inner side and/or the edges of the winding cross-section profile, the mold parting line may be designed to enclose an angle of more than 0° and less than 180° with the outer side and/or the inner side, so that burrs formed extend further inwards starting from the inner side or further outwards starting from the outer side. In other words, the mold parting line and burrs caused by it, in particular, are not parallel to the outer side and the inner side. This makes the resulting burrs particularly easy to remove.

Alternatively or additionally, the permanent mold may have additional indentations in at least part of the areas where the mold parting line runs along the outer side and/or the inner side and/or the edges of the winding cross-section profile. The additional indentations in the cavity produce corresponding additional material on the casting. The additional material is not required for the envisioned coil and represents sacrificial structures extending along the outer side and/or inner side and/or edges of the helical casting in the mold parting line. The sacrificial structures are removed in a finishing step after the casting has been removed, together with the burrs that run along them.

The burrs and/or the sacrificial structures may be removed, for example, by the mandrel described above and/or by milling processes and/or by grinding processes.

The casting material may comprise, for example, aluminum and/or copper. For example, a casting temperature may be above 1100° C. Examples of casting methods include die casting or permanent mold casting or low-pressure die casting.

The permanent mold for the helix, which is suitable for carrying out the method presented, comprises two mold halves which may be joined together along a mold parting line, wherein the mold halves of the permanent mold have, in the joined state, a cavity which predetermines the form of the helix or the bent-up helix for the casting. The helix or bent-up helix has the flattened winding cross-section profile, wherein the winding cross-section profile has the two opposite flat sides, the outer side and the inner side opposite the outer side. The flat sides face each other when the casting is in the form of a helix or is brought into the form of a helix.

In the permanent mold, the mold parting line runs at least once, in particular in one possible embodiment within each winding of the helix or bent-up helix defined by the cavity, along the flat sides from the inner side to the outer side. It may be, for example, that the mold parting line runs twice along the inner side and twice along the outer side per winding. The permanent mold has a protrusion extending along the mold parting lines, which tapers the cavity, in at least one of the areas where the mold parting line runs along the flat sides. The protrusion is used to produce the indentation on the flat side of the casting.

If a protrusion is provided on the flat side, the permanent mold comprises a recess complementary to the protrusion, which recess enlarges the cavity, and which recess runs along the mold parting line. The casting material entering this recess may then form the protrusion.

In embodiments of the permanent mold, the mold parting plane may run at least in sections along the outer side and/or along the inner side and/or along edges of the winding cross-section profile.

Accordingly, there may be burrs on the casting after removal from the mold, which burrs extend in the mold parting line described. Before possible further processing, the removed casting may represent a typical intermediate product, which is characterized by the described position of the burrs.

The helix may have a total of more than two windings, for example.

The cast helix, i.e. the helix which may be produced by the described method or by means of the described permanent mold, has the flattened winding cross-section profile. The winding cross-section profile has the two opposite flat sides, an outer side and an inner side opposite the outer side. The flat sides face each other.

The helix has, in at least a first of the two flat sides, an indentation running from the outer side to the inner side. It may also have several such indentations on the first flat side or several such indentations on both flat sides. The burrs may run in these indentations.

In embodiments of the helix, it is possible for it to have no burrs on the inner side and outer side, as these were removed in the method. Burrs usually only appear on the flat sides and run between the inner side and the outer side. Their course may be selected so that the length of each burr overlapping the flat side in this way is as short as possible, for example at most 50% longer than a width of the flat side in each case. At least a part of the burrs that run along the flat sides run along indentations.

It may also be that indentations are provided on the first of the flat sides and protrusions are provided on the second flat side, running from the outer side to the inner side and projecting into the indentations.

It must be emphasized that features that were only described in connection with the method may also be claimed for the permanent mold and/or the casting and vice versa.

Similarly, the features described in connection with the permanent mold may also be claimed for the casting and vice versa.

BRIEF DESCRIPTION OF THE DRAWINGS

The invention will be described in more detail hereafter by way of example based on the drawings.

In the drawings

FIG. 1 d shows the casting in the form of a bent-up helix,

DETAILED DESCRIPTION

Figure 1:
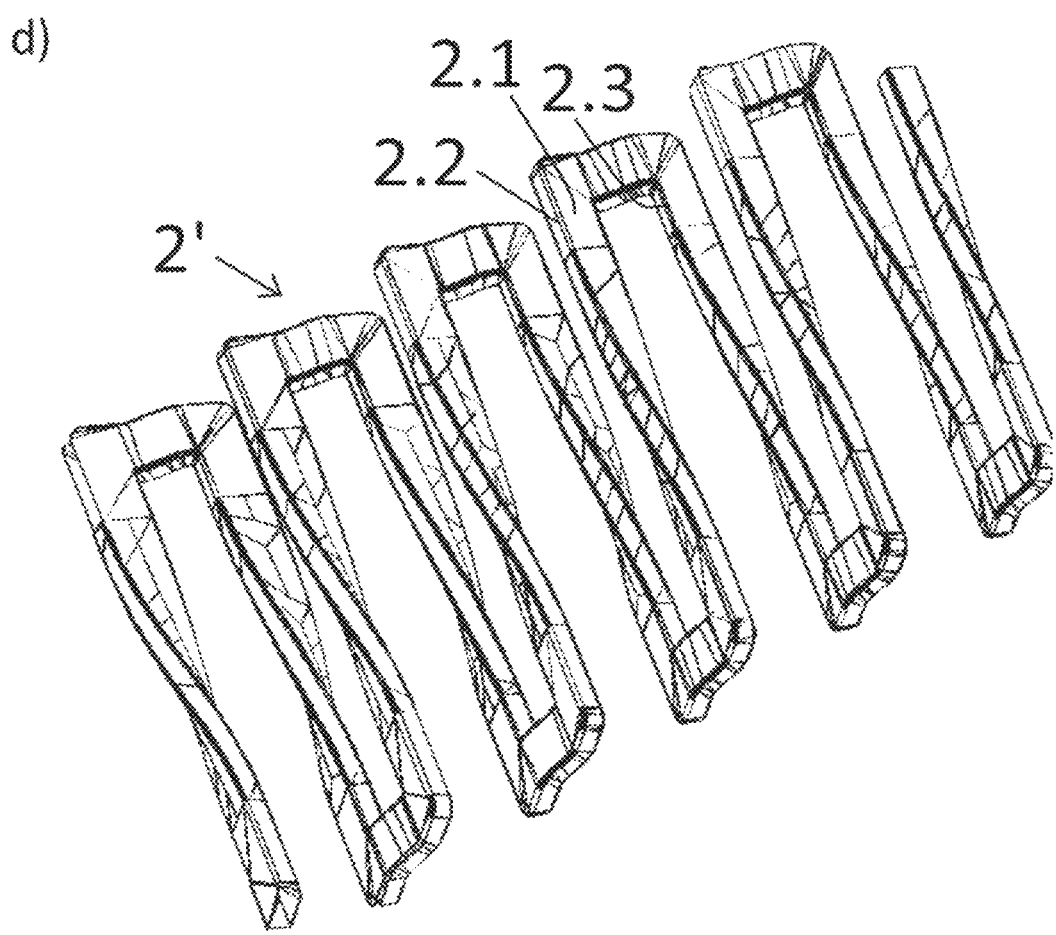
FIGS. 1 a-c show a casting in the form of a helix.

FIGS. 1 a-d show a casting which is in the form of a helix 2 in FIGS. 1 a-c and in the form of a bent-up helix 2' in FIG. 1d. From the form shown in FIG. 1d, the casting may be bent over into the form of the helix 2 (as shown in FIG. 1a-c).

FIG. 1a shows an oblique view of the casting as a helix 2, FIG. 1b a side view, and FIG. 1c a plan view. The helix has a flattened winding cross-section profile. In the present case, the winding cross-section profile is rectangular and has two opposite flat sides 2.1, 2.1', an outer side 2.2, and an inner side 2.3 opposite the outer side 2.2. An inner cavity of the helix 2, which is surrounded by the windings and delimited by the inner side 2.3, is also rectangular.

The outer dimensions of the helix, running around the outer side 2.2, are also rectangular or cuboid.

For the helix, adjacent windings may be defined such that each winding describes a complete revolution around the inner cavity of 360°. Seven windings are shown.

The winding cross-section as well as the embodiment of the cavity cannot be achieved by winding.

External dimensions of the helix in each direction may be, for example, between 2 cm and 20 cm.

This application relates firstly to the type of casting shown here as a helix or bent-up helix.

The helix may advantageously be produced by methods to which this application also relates. Furthermore, the helix may be advantageously produced with the aid of permanent molds, to which this application also relates. The helix, method and permanent mold are described in further detail below with reference to the remaining figures.

Figure 2:
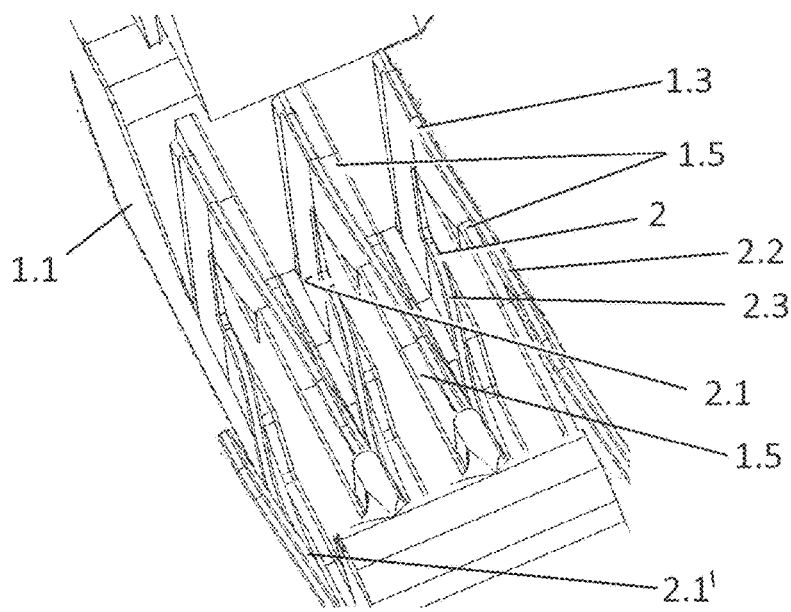
FIGS. 2 a-c, 3 and 4 show the casting within a cavity of a permanent mold.
Figure 2:
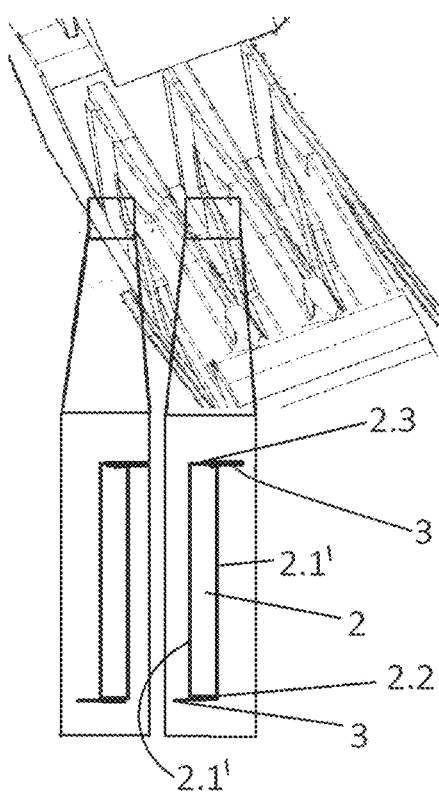
Figure 2:
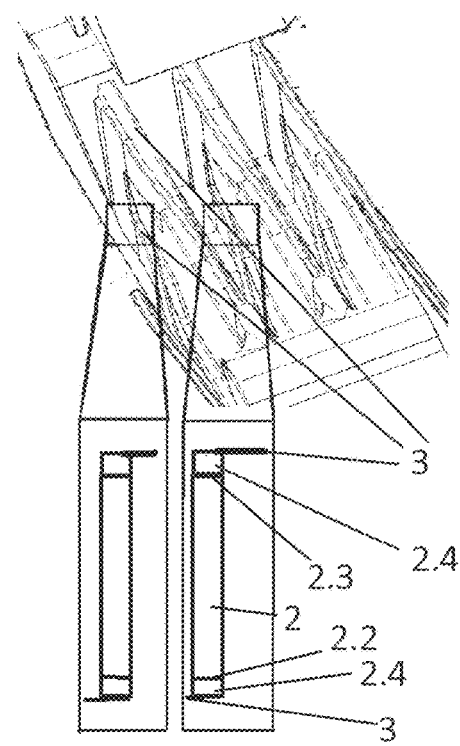

FIG. 2 shows the casting during a step of the method for its production, within a cavity 1.3 of a permanent mold 1. Only one mold half 1.1 of the permanent mold 1 is shown.

A second mold half 1.2 of the permanent mold 1 is constructed in a manner complementary to the first mold half 1.1 and has been omitted for better illustration in FIG. 2. The second mold half is designed in such a way that the first mold half 1.1 and the second mold half 1.2 may be joined in a mold parting line 1.5 and the cavity 1.3 extends between the two mold halves. The course of the cavity 1.3 can be seen in the figure by the shown casting, which has the form of the helix 2 and fills the cavity 1.3. The features of the helix 2 may be transferred accordingly to the cavity 1.3 and vice versa. In other words, the cavity is also rectangular in shape and has the opposing flat sides 2.1, 2.1', the outer side 2.2, and the inner side 2.3 opposite the outer side 2.2.

Furthermore, this figure thus also shows the shape of the second mold half 1.2.

The helix 2 is only slightly pulled apart but not bent up and otherwise has the features shown in FIG. 1.

As can be seen in the figure, the mold parting line 1.5 runs at least in sections along the outer side 2.2, along the inner side 2.3, as well as along edges of the winding cross-section profile. In particular, it extends in areas parallel to the inner side 2.3 and the outer side 2.2. It passes over each of the two flat sides 2.1, 2.1' twice within each winding.

To produce the casting, a casting material is poured into the cavity 1.3 of the permanent mold 1. The permanent mold 1 has a corresponding opening for this purpose. Die casting, permanent mold casting or low-pressure die casting methods may be used. The casting material comprises aluminum and/or copper. A casting temperature is above 1100° C.

It is possible for casting material outside the cavity 1.3 to enter the mold parting line 1.5 between the two mold halves 1.1, 1.2. This may cause burrs 3. The position of the burrs 3 may thus be deduced from the course of the mold parting line 1.5. Possible burrs 3 thus extend in the casting removed from the permanent mold shown in FIG. 2, starting from the outer side 2.2 or the inner side 2.3 parallel to the outer side 2.2 or inner side 2.3, respectively, and in regions in which the mold parting line 1.5 runs along the flat sides 2.1, 2.1', along the corresponding flat side 2.1, 2.1' and orthogonally thereto.

FIGS. 2b and 2c each show the view from FIG. 2a again, with two areas marked in each case, for which sections through the helix 2 are shown enlarged below the respective views. The position and orientation of the possible burrs 3 are illustrated in the sections. As shown in connection with FIG. 2a, they extend from inner and outer edges on the outer side 2.2 and the inner side 2.3 due to the course of the parting line 1.5. They run parallel to the outer side 2.2 and the inner side 2.3, in each case only in the direction of one of the flat sides 2.1, 2.1'.

The burrs are removed in a method step after the casting has been removed from the permanent mold 1. Due to their location, removal is easy.

In FIG. 2c, it is also shown that the cavity 1.3 has additional indentations extending along the entire outer side 2.2 and the entire inner side 2.1, including the respective edges. The indentations are used to produce sacrificial structures 2.4, of the helical casting. They run in the mold parting line 1.5 in such a way that the burrs 3 run at least in some areas along the sacrificial structures 2.4. The sacrificial structures are removed in a finishing step after the casting has been removed, together with the burrs 3 that run along them.

Figure 3:
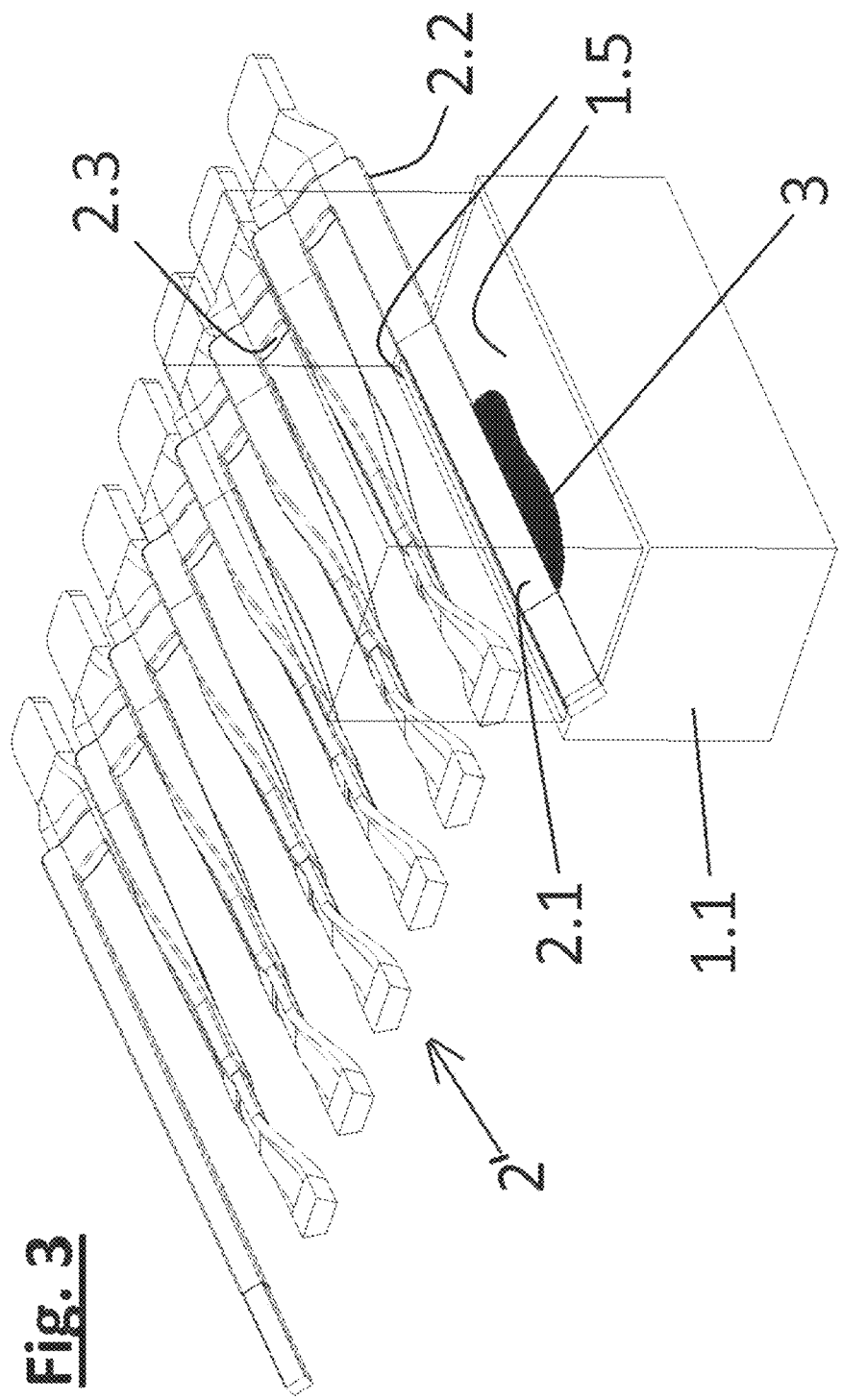
Figure 4:
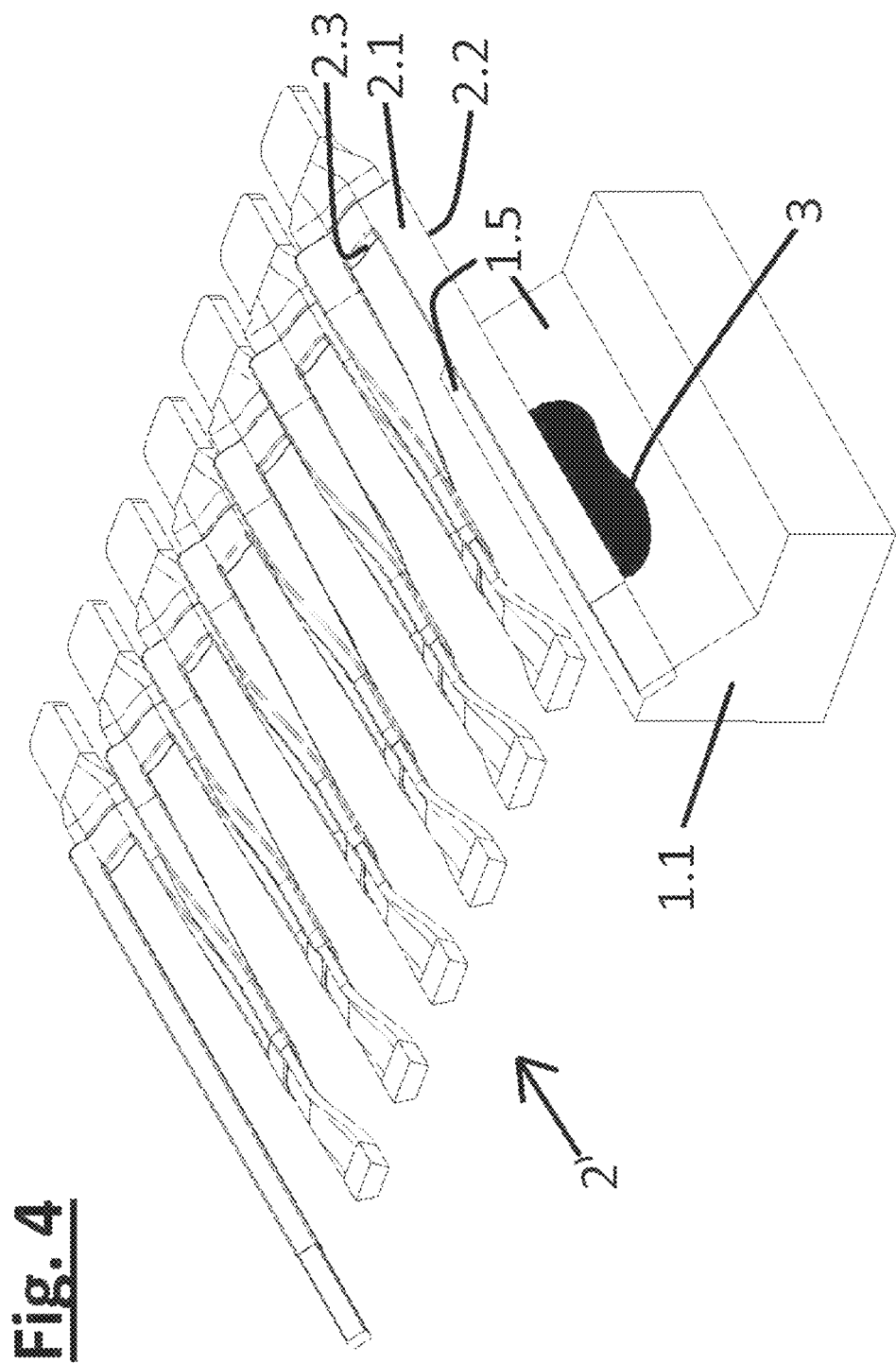

FIGS. 3 and 4 show permanent molds 1 with cavities 1.3 designed so that the casting produced therein has the form of the bent-up helix 2', which is bent into the form of the helix 2 after removal. Again, in each case, only the first mold half 1.1 is shown and the second mold half 1.2 is omitted for reasons of visibility. The bent-up helix 2' may be produced here with only two mold halves and without the use of cores or slides.

To produce the casting, a casting material is poured into the cavity 1.3 of the permanent mold 1. The permanent mold 1 has a corresponding opening for this purpose. Die casting, permanent mold casting or low-pressure die casting methods may be used. The casting material comprises aluminum and/or copper. A casting temperature is above 1100° C.

The mold parting line 1.5, a part of which is shown in an exemplary manner in FIGS. 3 and 4, has in the case of FIG. 3 an angle α of approximately 45° to both the outer side 2.2 and the inner side 2.3 of the bent-up helix 2'. Accordingly, possible burrs 3, one of which is shown by way of example, extend away from the outer side 2.2 or the inner side 2.3, respectively, at this angle α. This is in contrast to the embodiment shown in FIG. 2, where the burrs 3 run parallel to the outer side 2.2 or inner side 2.3, respectively. This has the effect that the burrs 3 may be removed even more easily. In FIG. 4, the mold parting line 1.5 is such that the angle α of the burrs 3 to the inner side 2.3 is approximately 45° and to the outer side 90°.

Figure 5:
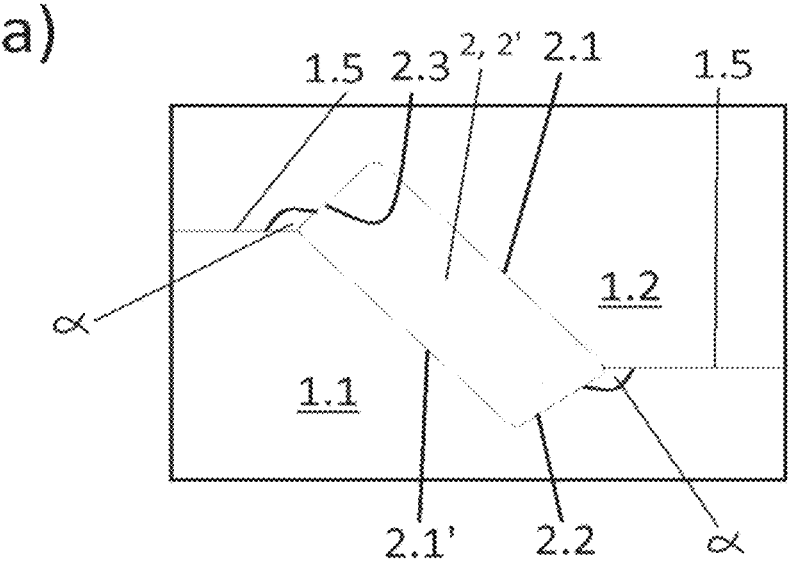
FIGS. 5 a-c show cross-sectional views of the casting within the cavity of the permanent mold, FIGS. 6 a and b show a finishing of the casting after removal from the permanent mold, FIGS. 7 a and b show one mold half of the permanent mold with additional protrusions, and FIGS. 8, 9 and 10 a and b show the casting with indentations on flat sides.
Figure 5:
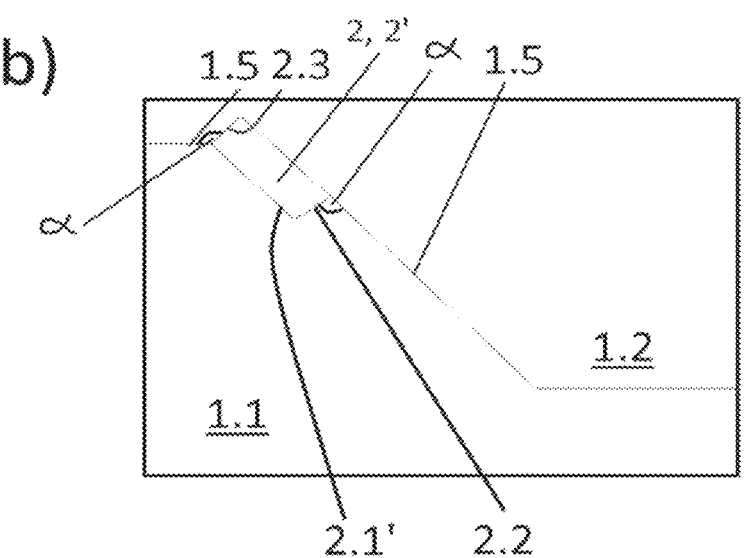
Figure 5:
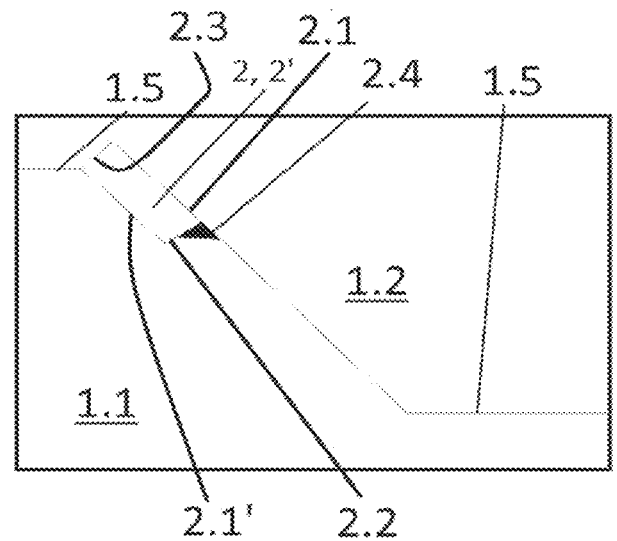

FIG. 5 shows sections through the two mold halves 1.1, 1.2 of the permanent mold 1 and the casting lying in the cavity 1.3 formed between them, illustrating in particular the mold parting line 1.5 and its position in relation to the casting. This may be the casting in the form of the helix 2 or in the form of the bent-up helix 2'.

In the area of the section shown in FIG. 5a (it may be, for example, a section through the configuration of FIG. 3), the angle α between the outer side 2.2 and the mold parting line 1.5 is approximately 45°. The mold parting line 1.5 extends here from an edge located on the outer side 2.2. The angle α between the inner side 2.2 and the mold parting line 1.5 is also approx. 45° and the mold parting line 1.5 extends here from an edge lying on the inner side 2.2.

In the area of the section shown in FIG. 5b (it may be, for example, a section through the configuration of FIG. 4), the mold parting line 1.5 again extends starting from edges located on the inner side 2.3 or outer side of the casting or cavity 1.3. The angle α between the inner side 2.3 and the mold parting line 1.5 is approx. 45°. The angle α between the outer side 2.2 and the mold parting line 1.5 is approx. 90°.

FIG. 5c shows a variation of the illustration in FIG. 5b. In this case, the mold parting line 1.5 does not extend directly from the edge of the casting on the outer side, but adjoins a sacrificial structure 2.4, which is provided as additional casting material arranged on the outer side 2.2 and may then be removed together with a possible burr 3.

Therefore, in all configurations from FIGS. 5 a to c, the mold parting line 1.5 encloses an angle of more than 0 degrees and less than 180 degrees with the outer side 2.2 and/or the inner side 2.3, and is therefore not parallel to either side.

Figure 6:
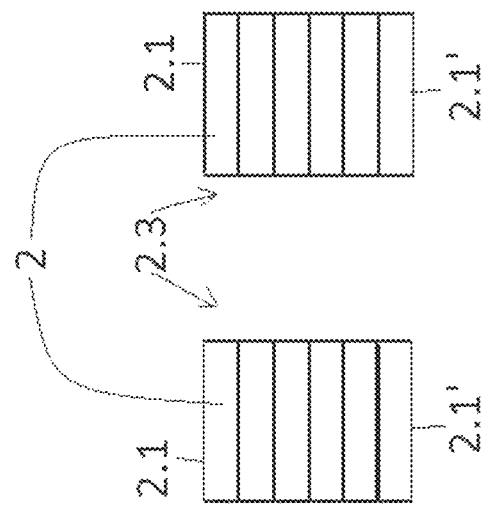
Figure 6:
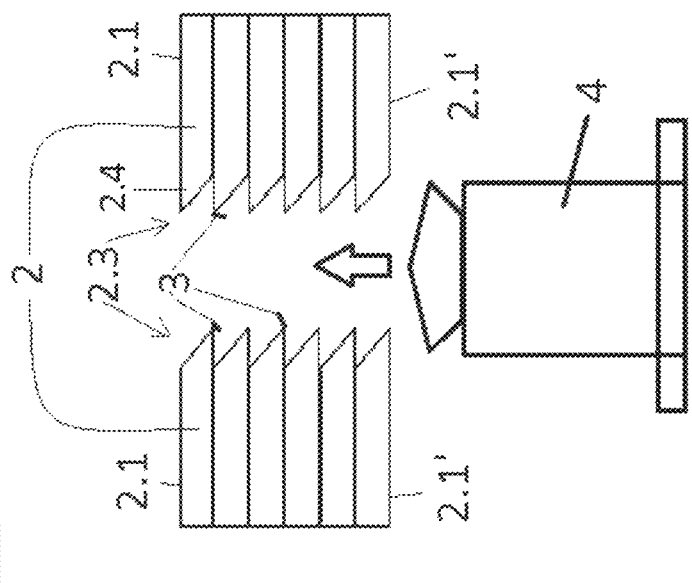

FIG. 6 shows how, in a method according to this application, burrs 3 located on the inner side 2.3 of the casting are removed. The burrs extend into the inner cavity of the casting when it is in the form of the helix 2. To remove the burrs, a mandrel 4 is inserted into the inner cavity, which has the dimensions of the inner cavity. Any excess material extending from the casting into the inner cavity is thereby bent over or removed. This excess material comprises in particular the burrs 3. Furthermore, as shown here, it may comprise sacrificial structures 2.4 positioned on the inner side 2.3 of the helix 2. The mandrel 4 may be inserted into the inner cavity even if the casting is initially, after removal from the permanent mold 1, in the shape of the helix 2, but slightly pulled apart. Similarly, the mandrel 4 may be inserted into the inner cavity if the casting is initially in the form of the bent-up helix 2 after removal from the permanent mold 1. The mandrel 4 has a flat part at one end which engages the flat side 2.1' and may bend the casting, with simultaneous counterpressure from the other flat side 2.1, into the form of the helix.

Figure 7:
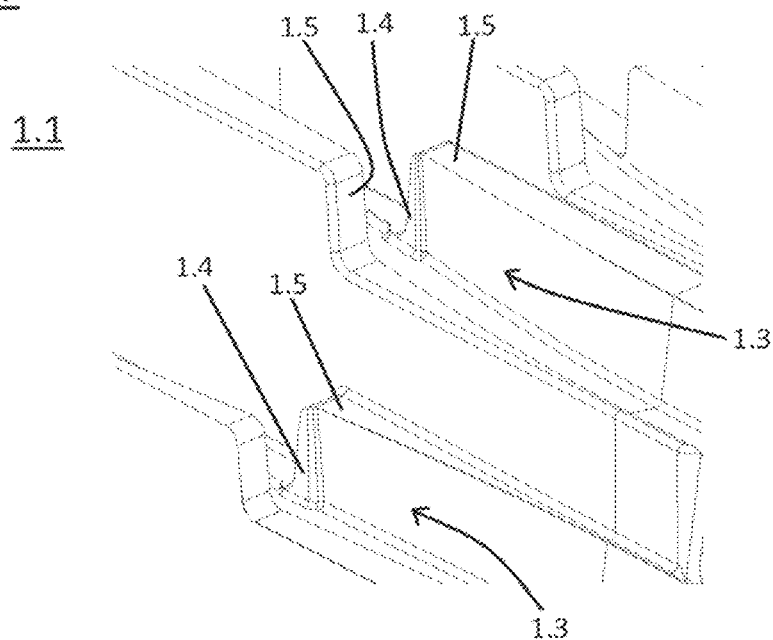
Figure 7:
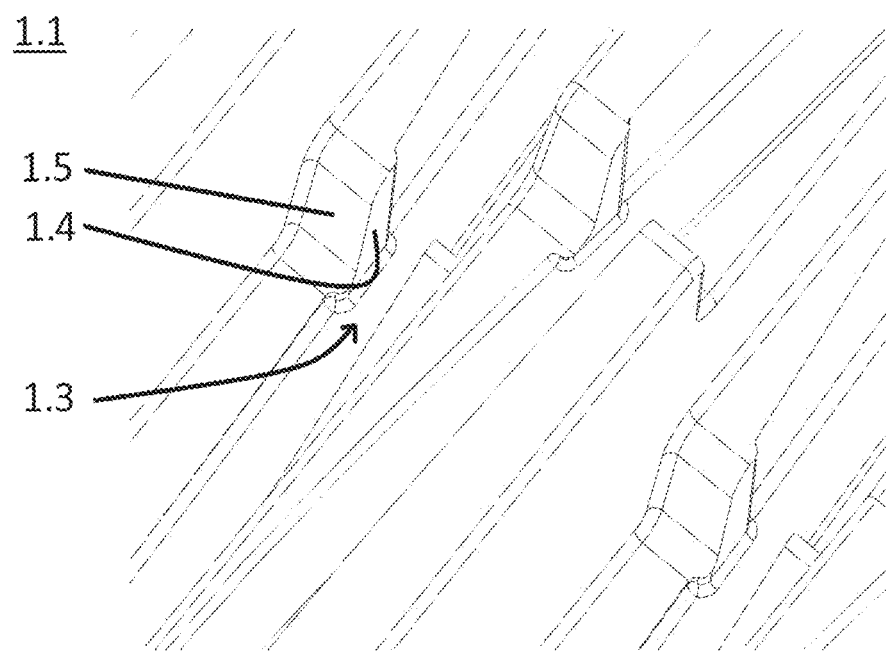

FIG. 7 shows the first mold half 1.1 of the permanent mold 1 with the cavity 1.3. FIG. 7 a shows an oblique view from the side and FIG. 7 b an oblique view from above. Here, the permanent mold 1 has protrusions 1.4 extending along the mold parting lines 1.5 in some of the areas where the mold parting line 1.5 runs along one of the flat sides 2.1, 2.1', which project into the cavity 1.3 and taper it. The casting produced with this permanent mold 1 thus has corresponding indentations 2.5 on the flat sides 2.1, 2.1', which are complementary to the protrusions 1.4 and run from the inner side 2.3 to the outer side 2.2. Since the mold parting line 1.5 runs along this protrusion 1.4, the burrs 3 may be laid in the indentations 2.5 with this permanent mold.

The described embodiment is also possible for tools that otherwise have the features from FIGS. 2-5.

To produce the casting, a casting material is poured into the cavity 1.3 of the permanent mold 1. The permanent mold 1 has a corresponding opening for this purpose. Die casting, permanent mold casting or low-pressure die casting methods may be used. The casting material comprises aluminum and/or copper. A casting temperature is above 1100° C.

Figure 8:
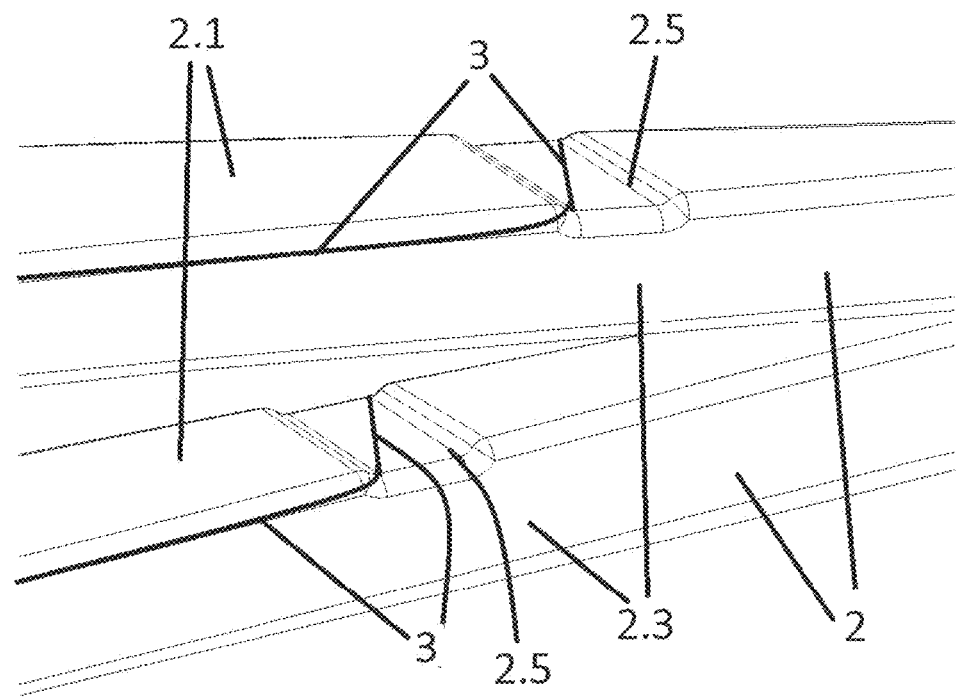
Figure 9:
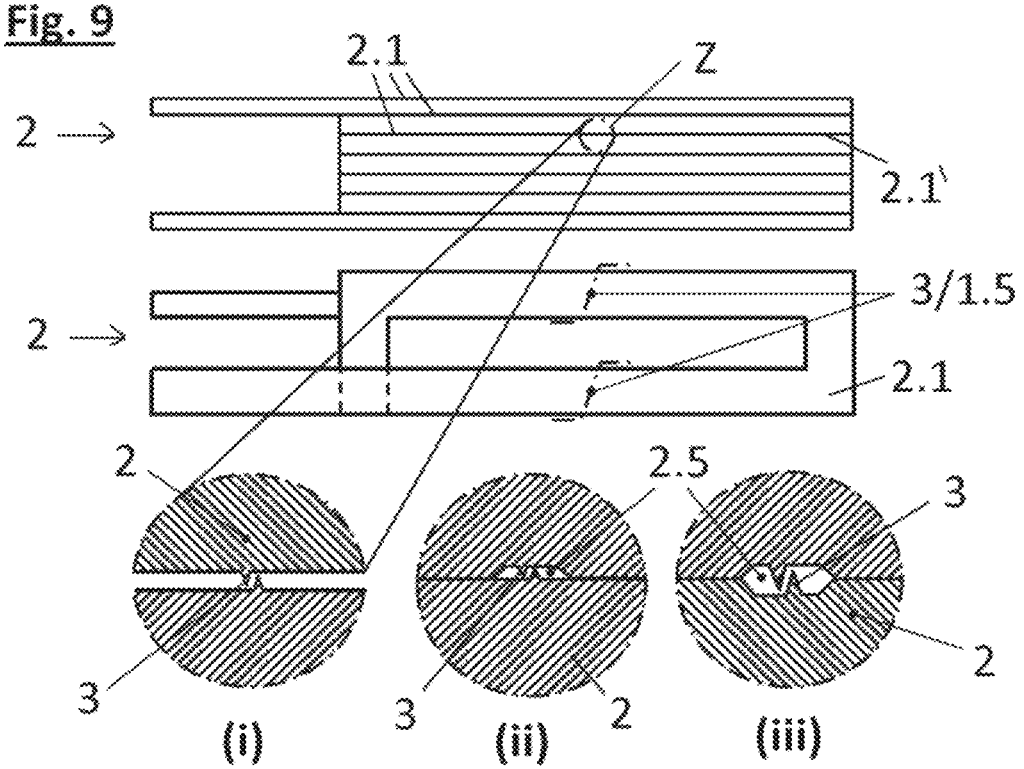

FIGS. 8 and 9 illustrate castings produced, for example, with the permanent mold 1 of FIG. 7. They have the indentations 2.5 on one or both of the flat sides 2.1, 2.1'.

FIG. 8 shows sections of windings of the casting in which indentations are arranged on the first flat side 2.1. The indentations 2.5 run orthogonally to the edges of the casting, connecting the outer side 2.2 and the inner side 2.3. The position of possible burrs 3 is indicated in FIG. 8. According to the embodiment of the permanent mold 1 shown in FIG. 7, they run diagonally through the indentations 2.5 and are thus harmless, since they do not touch the second flat side 2.1' even when the casting is compressed as a helix 2. In the area of the edges, when the mold parting line 1.5 and thus the burrs 3 come into the area of the outer side 2.2 or inner side 2.3, the mold parting line 1.5 and thus the burr 3 are guided along the edge and may be removed in a finishing step, together with any sacrificial structures 2.4 present there. In FIG. 8, no indentation 2.5 is provided on the second flat side 2.1', since burrs 3 running there are predetermined by the mold parting line 1.5 in such a way that they project into the recesses 2.5 of the first flat side 2.1 when the helix 2 is compressed and are thus also harmless.

FIG. 9 illustrates further possible embodiments in which burrs 3 lying on flat sides are rendered harmless by indentations 2.5.

At the top of the figure, the helix 2 is shown in the side view from FIG. 1 b. In this side view, an area Z is marked, which is shown enlarged at the bottom in FIG. 9 for three embodiments (i), (ii), (iii) of the helix.

The center of FIG. 9 shows the plan view from FIG. 1c, in which the course of the mold parting line 1.5 and thus the course of the burrs 3 over the flat sides 2.1, 2.1', from the outer side 2.2 to the inner side 2.3, is shown. It is precisely this burr 3 that is now shown enlarged below in the figure for the three embodiments (i), (ii), (iii).

Embodiment (i) is an embodiment in which there is no indentation 2.5 at all. In such embodiments, the burrs 3 may have to be removed in a finishing step on the outer side 2.2 and/or inner side 2.3 and/or the flat sides 2.3.

Embodiment (ii) shows an indentation 2.5 on only one flat side 2.1'. The burr 3 runs on both flat sides 2.1, 2.1' within this indentation 2.5, wherein the burr 3 on one flat side 2.1 is offset with respect to the other flat side 2.1' in such a way that the burrs 3 of the flat sides 2.1, 2.1' facing one another do not touch even when the helix 2 is completely compressed as shown here.

Embodiment (iii) is an embodiment in which indentations 2.5 are present on both flat sides 2.1, 2.1'. The burrs 3 are offset from each other as in (ii) and cannot touch. In this embodiment, even larger burrs 3 may be tolerated than in (ii).

FIG. 10 again shows the helix 2, in which burrs running along flat sides are to be rendered harmless. The view is selected as in FIG. 9 at the bottom.

Figure 10:
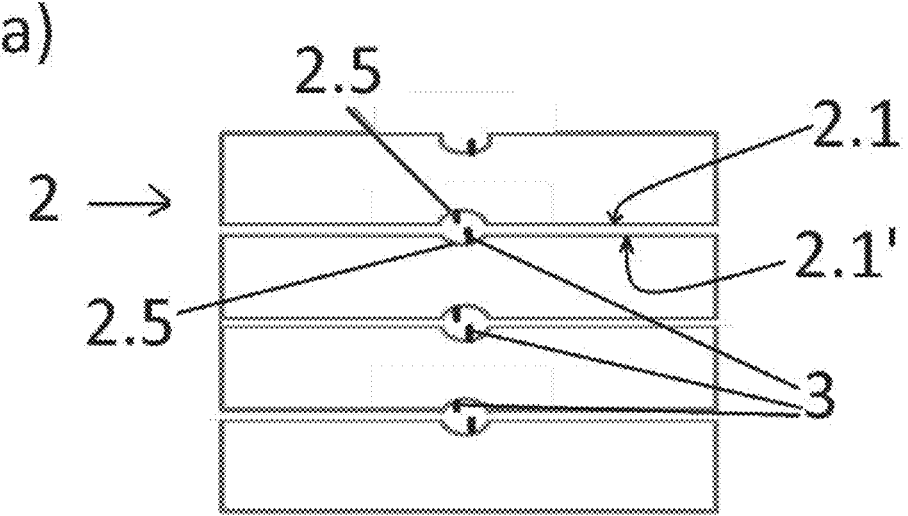
Figure 10:
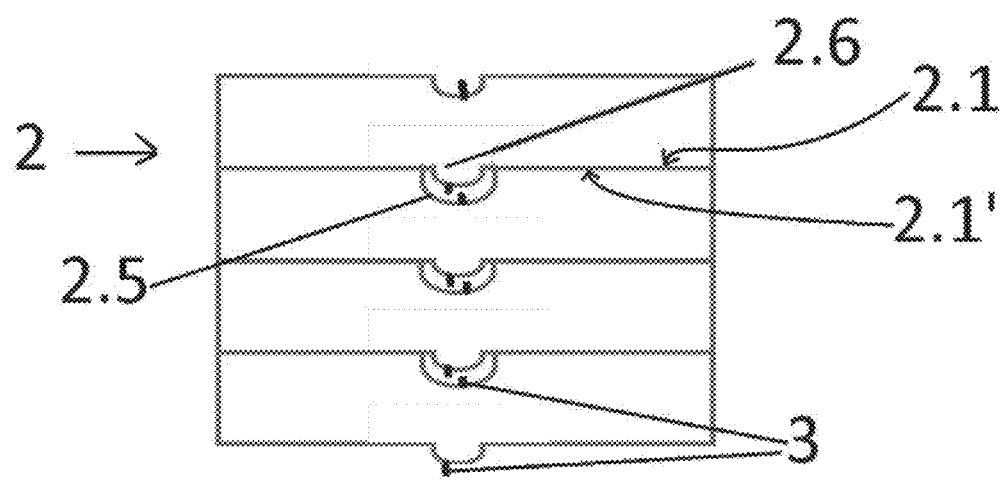

Similarly to embodiment (iii), FIG. 10 *a* has indentations 2.5 on both flat sides 2.1, 2.1'. The corresponding permanent mold 1 thus has protrusions 1.4 complementary to the indentations 2.5 on both flat sides 2.1, 2.1'.

In contrast, the embodiment shown in FIG. 10 *b* has indentations 2.5 on the flat side 2.1', but protrusions 2.6 on the other flat side 2.1. These protrusions 2.6 of the helix 2 are positioned similarly to the indentations 2.5, i.e. they run along the mold parting line 1.5. Burrs 3 therefore also extend along the protrusions 2.6. When the helix 2 is compressed as shown in FIG. 10 *b*, the protrusions 2.6 and the burrs 3 located thereon are pressed into the indentations 2.5. The dimensions of the protrusions 2.6 are smaller here than the dimensions of the indentations 2.5, so that the protrusions 2.6 and the burrs 3 may be accommodated in the indentations 2.5. The additional material provided in the form of protrusions 2.6 on the flat side 2.1 may at least partially compensate for a loss of cross section. For the production of such a casting as shown in FIG. 10 *b*, the permanent mold 1 has recesses on one of the flat sides 2.1, 2.1' which extend in the mold parting line 1.5 and, by correspondingly enlarging the cavity 1.3, define the protrusions 2.6. On the other of the two flat sides 2.1, 2.1', on the other hand, it has the protrusions 1.4 that define the indentations 2.5.

LIST OF REFERENCE NUMERALS 1 permanent mold
1.1 first mold half
1.2 second mold half
1.3 cavity
1.4 protrusion of the permanent mold
1.5 mold parting line
2 helix
2' bent-up helix
2.1, 2.1' flat side
2.2 outer side
2.3 inner side
2.4 sacrificial structure
2.5 indentation
2.6 protrusion
3 burr
4 mandrel

The invention claimed is:

1. A method for producing a helix, the method comprising:

providing a permanent mold including a first mold half and a second mold half configured to be joined together in a mold parting plane;
joining together the first mold half and the second mold half of the permanent mold in the mold parting plane so that the permanent mold, when joined, has a cavity that defines a form of the helix or a form of a bent-up helix, wherein the defined helix or bent-up helix has a flattened winding cross-section profile including:
a first flat side;
a second flat side located opposite to the first flat side;
an outer side; and
an inner side opposite the outer side;
introducing a casting material into the cavity to produce a casting having the form of the helix defined by the cavity or the form of the bent-up helix;
opening the permanent mold; and
removing the casting, wherein the first flat side and the second flat side of the casting face each other when the casting is in the form of the helix or is brought into the form of the helix, wherein a mold parting line sectionally runs along the first flat side and the second flat side from the inner side to the outer side, and wherein the permanent mold, at least in a portion where the mold parting line runs along at least one of the first flat side or the second flat side, includes a protrusion extending along the mold parting line that projects into the cavity so that the casting contains a first indentation on the first flat side and a corresponding second indentation on the second flat side.

2. The method according to claim 1, wherein the permanent mold, in each portion where the mold parting line runs along the first of the flat side, includes a first set of multiple protrusions extending along the mold parting line protruding into the cavity, such that the casting includes, on the first flat side, with a corresponding first set of indentations running in the mold parting line.

3. The method according to claim 2, wherein the permanent mold, in each portion where the mold parting line runs along the second flat side, includes at least one of: a second set of multiple protrusions extending along the mold parting line, such that the casting includes a second set of indentations running in the mold parting line, or includes multiple recesses extending along the mold parting line, such that the casting includes on the first flat side in the mold parting line with the first set of indentations, and on the second flat side in the mold parting line with protrusions, wherein the protrusions lie within the first set of indentations when the casting is in the form of the helix.

4. The method according to claim 1, wherein the casting is bent into the form of the helix after removal.

5. The method according to claim 1, wherein the casting material comprises at least one of: aluminum or copper.

6. The method according to claim 1, wherein the casting is performed at a temperature above 1100° C.

7. The method according to claim 1, wherein introducing the casting material into the cavity includes using a die casting method, a permanent mold casting method, or a low-pressure die casting method.

8. The method according to claim 1, wherein the mold parting line runs at least in sections along at least one of: the outer side, the inner side, or from edges of a winding cross-section profile, and burrs extending on at least one of: the outer side, the inner side or the edges of the casting in the mold parting line are removed after the casting has been removed.

9. The method according to claim 8, wherein the cavity, in at least one portion where the mold parting line runs along at least one of: the outer side, the inner side or the edges of the winding cross-section profile, include multiple additional indentations to produce multiple sacrificial structures which extend along at least one of: the outer side, the inner side, or the edges of the casting in the mold parting line, wherein the multiple sacrificial structures are removed in a reworking step after the casting has been removed, together with the burrs that run along them.

10. The method according to claim 8, wherein a mandrel is inserted into the bent-up helix in order to at least one of: remove the burrs on the inner side or to bend together the bent-up helix to form the helix.

11. The method according to claim 8, wherein the mold parting line, in sections in which the mold part line runs along at least one of the outer side, the inner side, or one or more the edges of the winding cross-section profile, encloses an angle (α) of more than 0° and less than 180° with at least one of the outer side or the inner side.

12. A permanent mold for casting a helix, comprising:
a first mold half; and
a second mold half;
wherein, the first mold half and the second mold half are configured to be joined together in a mold parting plane, the mold parting plane forming a mold parting line, wherein the first mold half and the second mold half, when joined, have a cavity that defines, for the casting, a form of at least one of the helix or a bent-up helix with a flattened winding cross-section profile, wherein a casting material is introduced into the cavity to produce the casting, wherein the winding cross-section profile has a first flat side and a second flat side located opposite the first flat side, an outer side, and an inner side located opposite the outer side, wherein the first flat side and the second flat side face one another when the casting is in the form of the helix or is brought into the form of the helix, wherein the mold parting line, within each winding of the helix or bent-up helix defined by the cavity, runs along the first flat side and the second flat side from the inner side to the outer side, and wherein the cavity, at least in one portion where the mold parting line runs along the first flat side and the second flat side, has a protrusion extending along the mold parting line.

13. The permanent mold of claim 12, wherein the mold parting line runs at least in sections along at least one of: the outer side, the inner side, or from a first edge or a second edge of a winding cross-section profile.

14. The permanent mold of claim 12, wherein the mold parting line includes a set of multiple protrusions extending along the mold parting line protruding into the cavity, such that the casting includes, on the first flat side, with a corresponding set of indentations running in the mold parting line.

15. The permanent mold of claim 14, wherein in each portion where the mold parting line runs along the second flat side, the mold includes:
a second set of multiple protrusions extending along the mold parting line such that the casting includes a second set of indentations running in the mold parting line.

16. The permanent mold of claim 14, wherein in each portion where the mold parting line runs along the second flat side, the mold includes:
multiple recesses extending along the mold parting line such that the casting includes, on the first flat side in the mold parting line with the first set of indentations, and on the second flat side of the mold parting line with protrusions located to lie within the first set of indentations when the casting is in the form of the helix.

17. The permanent mold of claim 12, wherein the casting material comprises at least one of aluminum or copper.

* * * * *